Nov. 9, 1954     P. TROMBETTA     2,694,165
SOLENOID

Filed March 21, 1951     2 Sheets-Sheet 1

INVENTOR.
Panfilo Trombetta
BY
Mason, Kolehmainen,
Rathburn and Wyss
Attorneys

Nov. 9, 1954 P. TROMBETTA 2,694,165
SOLENOID
Filed March 21, 1951 2 Sheets-Sheet 2

INVENTOR.
Panfilo Trombetta
BY Mason, Kolehmainen,
Rathburn and Wyss
Attorneys

United States Patent Office 2,694,165
Patented Nov. 9, 1954

2,694,165

SOLENOID

Panfilo Trombetta, Milwaukee, Wis.

Application March 21, 1951, Serial No. 216,771

7 Claims. (Cl. 317—165)

The present invention relates to electrical solenoids and more particularly to solenoids of the oil immersed and/or explosion-proof type.

Solenoids are extensively used as the prime movers for an infinite variety of devices for the reason that they are relatively small and compact, are electrically controlled and will give years of fool-proof and satisfactory service. The operation to be performed by the solenoid may require forces of varying magnitudes acting through varying distances and under these conditions solenoids have been manufactured in different sizes to produce the necessary operating force. It will be understood that the specifications for solenoids, just like the specifications for other electrical devices, will permit of a certain maximum temperature rise. Many solenoid mechanisms are air cooled and as a result the temperature rise may be greater than desired for particular applications with a certain size of solenoid. For many applications it would be desirable to maintain the solenoid small while still capable of producing the necessary operating force and furthermore complying with the specifications with respect to maximum temperature rise above ambient temperature. An oil immersed solenoid suggests itself as a means of maintaining a lower temperature rise with a smaller operating mechanism. In view of the fact that solenoids are employed for producing an infinite variety of operations, the particular direction of operation of the mechanism to be driven by the solenoid may require peculiar mounting of the solenoid. It would also be desirable, therefore, to provide an oil immersed solenoid which is capable of being mounted in any one of a variety of positions to provide substantially universal application of the solenoid.

There are also numerous applications of solenoids in locations where explosive or hazardous atmospheres might prevail such as in oil refineries, chemical plants and the like, and although normally a solenoid, unlike a circuit breaker does not produce an electric arc, nevertheless there is the possibility of failure of the solenoid winding causing it to burn up, and hence the requirement by Underwriter's Laboratories that such devices must be explosion-proof devices when used in hazardous locations.

Accordingly, it is an object of the present invention to provide a new and improved oil immersed solenoid.

It is another object of the present invention to provide an oil immersed solenoid adapted for universal application in that it is capable of being mounted in any one of numerous positions to give the desired operating stroke in a very large number of different planes.

It is another object of the present invention to provide an explosion-proof solenoid unit which meets the requirements of Underwriter's Laboratories without being of inordinate size.

Still another object of the present invention is to provide a new and improved solenoid unit of the oil immersed or explosion-proof type which will give long years of fool-proof and satisfactory service, which has a low manufacturing cost, can readily be assembled, and which is of sturdy construction.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 7 is a sectional view taken through a portion of the operating mechanism of the modification of Fig. 6 to illustrate one of the explosion-proof features thereof.

Briefly, the present invention is concerned with a solenoid comprising a hermetically sealed tank or casing within which is disposed a solenoid mounted at the bottom of the casing and arranged to operate a rotatable shaft extending outside the casing through a suitable packing gland. The portion of the shaft extending outside the tank is adapted to be connected by means of a suitable crank arm to any device to be operated. The hermetically sealed casing is adapted to be filled with oil to a predetermined level and the casing is, moreover, provided with a large number of closed vents located at strategic positions one of which is permitted to be opened to permit breathing with respect to the hermetically sealed container. By removing a particular one of the closures for the vent openings, the unit may be mounted in any one of a large number of positions with the vent located at what effectively comprises the "top" of the device. In the explosion-proof construction, a novel cover arrangement is provided to offer the necessary linear length of seal produced by closely fitting surfaces and the device is constructed so that high pressures produced within the hermetically sealed casing cannot cause portions thereof to be blown out.

Figure 5:
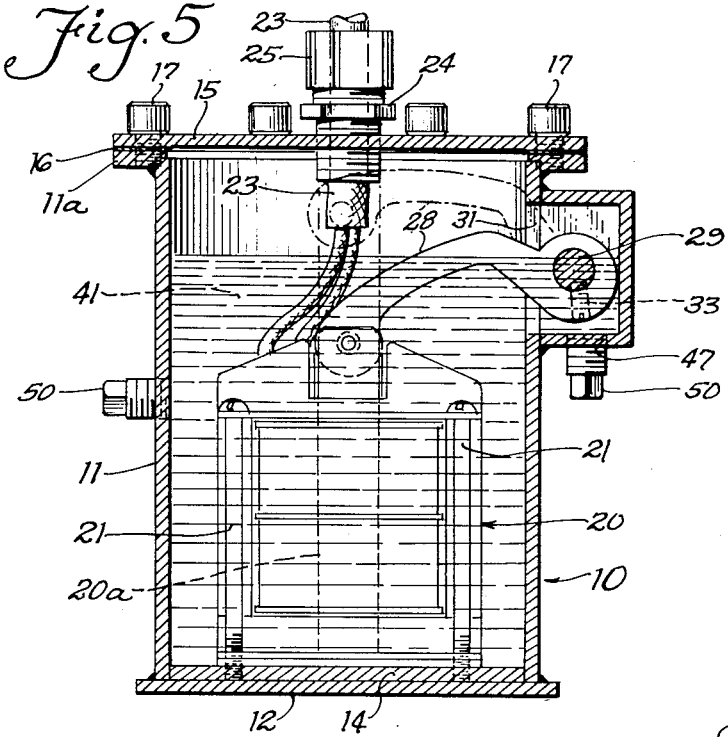
Fig. 5 is an enlarged vertical sectional view of the solenoid of Fig. 1 shown in the position of Fig. 1.

Referring now to the drawings, and particularly to Figs. 1 to 5 thereof, there is illustrated the oil immersed solenoid of the present invention generally indicated by the reference numeral 10 which comprises a hermetically sealed container 11 designated in the drawings as a cylindrical casing which is provided at its closed end by a mounting flange designated as 12 and provided with a plurality of openings 13 for accommodating suitable fastening means or the like. The mounting flange is indicated as a flat plate preferably welded to one end of the cylindrical casing 11 to provide a closure for that end and at the same time is sufficiently large so as to provide an extending portion acting as the mounting flange 12. As best shown in Fig. 5 of the drawings, the flange 12 may be united to a plate 14 of the same diameter as the internal diameter of the casing 11, although obviously elements 12 and 14 may be an integral element. The end of the cylindrical container 11 opposite the mounting flange 12 is provided with a peripheral flange 11a for providing a suitable annular seat for a suitable cover 15. Preferably a suitable sealing gasket 16 is interposed between the adjacent annular surfaces of the cover 15 and the peripheral flange 11a. The casing for the solenoid 10 is essentially made a hermetically sealed unit by securing the cover 15 to the flange 11a by suitable screws or fastening means 17.

Disposed within the hermetically sealed casing is a solenoid generally designated by the reference numeral 20 in Fig. 5 of the drawings, which, however, forms no part of the present invention and is illustrated as being secured to the closed end of the hermetically sealed container 11 by suitable screws or fastening means 21 threadedly engaging tapped openings in the plate 14. By having the mounting flange 12 and the plate 14 as separate elements, the tapped openings for the screws 21 can be provided only in the plate 14 thereby being sure that the tapped openings do not go through the entire bottom of the casing. Obviously plates 12 and 14 could comprise a single element serving both as the mounting flange and a closure member for the cylindrical container 11 of sufficient thickness to accommodate the mounting screws 21.

For the purpose of bringing the electrical conductors for energizing the winding of the solenoid 20 outside the hermetically sealed casing, these conductors illustrated as being arranged in the form of a cable 23 pass through a suitable opening defined in the cover plate 15 which has threadedly secured therein a suitable double bushing 24. A sealing washer not shown in the drawings of annular type is compressed by a suitable cap 25 around the cable 23 within a portion of the double bushing 24 to insure the necessary hermetic seal desired.

In order to transmit outside the hermetically sealed housing 11 the force produced by operation of the solenoid 20, the armature 20a of the solenoid is connected to one end of a suitable crank arm 28 keyed or otherwise secured to a shaft 29 journalled within a lateral extension of the cylindrical casing 11 defined by the member 30. As best shown in the drawings, the member 30 comprises a small rectangular housing secured to the cylindrical surface of the casing 11 which casing is preferably provided with an elongated slot 31 connecting the interior of the hermetically sealed container 11 with the chamber defined by the housing portion 30. As illustrated, the crank arm 28 extends through the elongated slot 31 into the chamber defined by the housing portion 30 and has its other end keyed or otherwise secured as by means generally designated at 33 to the shaft 29. The two extreme positions of the armature 20a and consequently also the crank 28 are shown in Fig. 5, one by dotted lines and the other by solid lines. The shaft 29 extends outside the chamber defined by the housing portion 30 through a suitable packing gland of any desired construction, and a suitable bushing 36 is threadedly engaged with an enlarged opening in the housing portion 30 where the shaft 29 protrudes therethrough. The end of the shaft 29 extending outside the housing portion 30 is provided with an adapter 37 which may be rigidly related to the shaft 29 by a press fit or any other arrangement. This adapter is provided with a plurality of key ways or slots 38, four of them being shown and adjacent ones being spaced from one another by ninety degrees. These key ways permit a suitable crank arm 40 to be attached to the adapter 37 in any of four positions so that with the solenoid 10 mounted in the position shown in Figs. 1 and 5 of the drawings, the stroke in response to energization of the solenoid can be either up or down in the vertical direction or back or forth in the horizontal direction.

It will be understood that a suitable fluid preferably a transformer oil generally designated at 41 is disposed within the housing 11 so as completely to immerse the solenoid 20. It will be understood that breathing or pressure equalization within the hermetically sealed container 11 is desired otherwise if high temperatures should ensue, considerable pressure might be built up within the casing and at other times the pressure might be much different. Accordingly, therefore, suitable venting means in the form of an opening such as is designated at 44 in Fig. 1 of the drawings is provided in the cover.

Figures 2, 3:
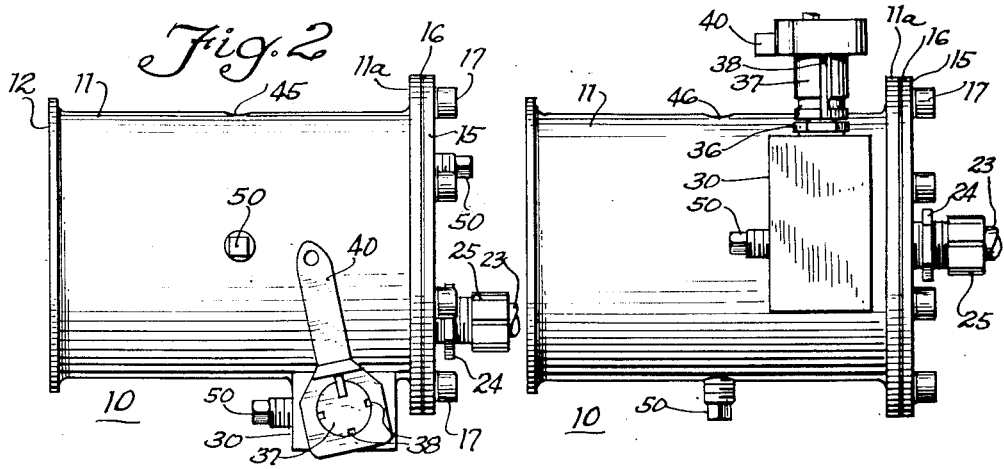
Figs. 2, 3 and 4 are elevational views of the solenoid of Fig. 1 shown in three different mounting positions from that shown in Fig. 1 to provide an operating stroke disposed in three planes each different from the plane of the operating stroke of Fig. 1.
Figure 4:
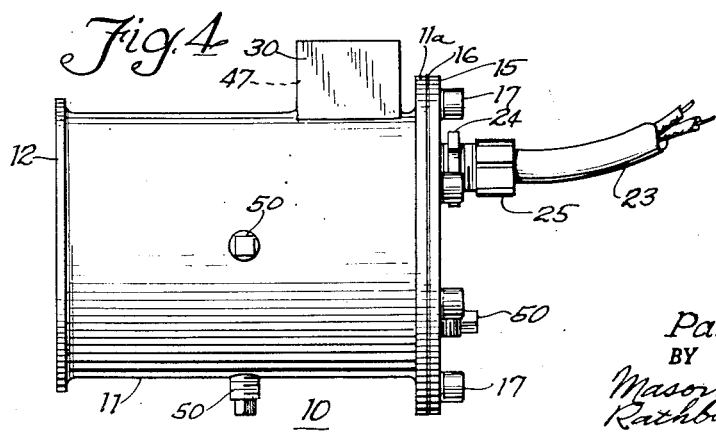

The solenoid of the present invention is constructed so as to permit mounting in any one of a large number of positions so that the operating stroke may be obtainable in any one of a large number of different planes whereby the solenoid is substantially universally adaptable without means other than a rod connection between the crank 40 and the means to be operated. In Fig. 2, for example, the solenoid 10 is indicated disposed on its side with the housing portion 30 at the bottom. In Fig. 3 the solenoid is again disposed on its side with the housing portion 30 on one side, and in Fig. 4 the solenoid is again disposed on its side with the housing portion 30 at the top. In order that a suitable vent corresponding to 44 may be provided at the part of the housing which becomes the "top" for the particular mounting positions shown in Figs. 2, 3 and 4, there are produced in accordance with the present invention a plurality of strategically placed openings in the housing for the solenoid 10 such as the openings 45, 46 and 47 all of which openings are normally closed by closure plugs 50 including the opening 44. As illustrated in the drawings, the openings such as 45 and 46 are spaced at angles of ninety degrees around the center of the cylindrical housing portion 11 with the opening 47 provided at the bottom of the housing section 30 when the solenoid is mounted in the upright position shown in Fig. 5 of the drawings. These four openings plus the opening provided in the cover 15 permit mounting the device in five separate positions, which with the combination of key slots 38 effectively provides twenty possible operating mounts for the crank arm 40. Moreover, the solenoid 10 can be installed with a minimum of delay in any one of these positions with the vent opening correctly defined by merely removing an appropriate one of the closure plugs 50.

Figure 6:
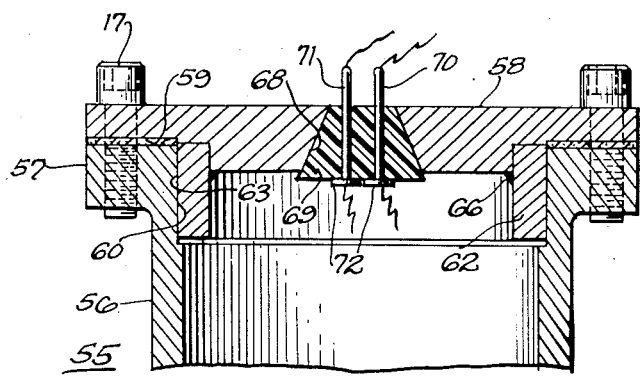
Fig. 6 is an enlarged sectional view of the upper portion of an explosion-proof solenoid illustrating a modification of the present invention.
Figure 2:
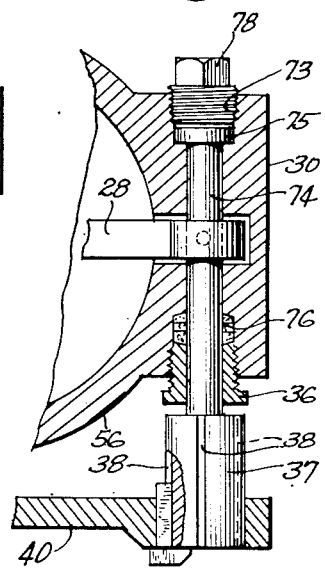

In the event that an explosion-proof construction is required, the Underwriter's Laboratories require a minimum linear distance between close fitting parts through which escaping gas or liquid under pressure must pass in order to meet the terms of an explosion-proof device. Moreover, this minimum distance is substantially greater than the distance defined by the width of the annular flange 11a of Fig. 5. As is best shown in Figs. 6 and 7 of the drawings, in accordance with the present invention, the explosion-proof housing for the solenoid generally designated by the reference numeral 55 may comprise a cylindrical container 56 similar to the container 11 described above provided at its upper end with an annular flange 57. Some of the corresponding parts of Figs. 6 and 7 are designated by the same reference numerals as in Figs. 1 to 5 of the drawings. A suitable cover or closure member 58 is provided having a surface portion 59 cooperating with one side of the annular flange 57. These adjacent surfaces may have a ground fit to give a good seal. In any event they should be finished or matched surfaces. In order to increase the linear length of such a ground seal with respect to the minimum length of passageway through which escaping gases must pass, there is provided in accordance with the present invention a ground annular surface 60 adjacent the upper end and on the inside of the cylindrical housing 56 which may be produced by a suitable boring operation. Moreover, the cover 58 is provided with a depending annular flange 62 having an outer ground surface 63 cooperating with the ground surface 60. It will be apparent that the linear length of these finished or matched surfaces with respect to a passageway defined therebetween from within the hermetically sealed container 55 to the exterior can have any desired length by merely increasing the width of the member 62 thereby fully complying with the Underwriter's requirements and at the same time maintaining the annular flange 57 of relatively narrow dimension so as not to interfere with movement of the crank arm 40 or require an inordinately large casing or an unusually long shaft 29. The cover 58 may comprise an integral member or as illustrated may comprise two members including a disk-like cover member and the annular flange 62 suitably welded thereto as indicated at 66.

Since relatively high pressures of the order of 1200 pounds per square inch may be built up within the explosion-proof casing 56, it is necessary to provide means to permit the electrical conductors leading to the solenoid winding to pass through the housing without providing a weak link as far as the explosion-proof feature thereof is concerned. To this end, as illustrated in the drawings, the cover 58 is provided with a somewhat conical shaped opening 68 for receiving an insulating plug 69 also of conical shape and disposed so that the pressure within the explosion-proof housing 56 will tend to move the closure 69 into sealing engagement with the conical opening 68. The closure 69 may be formed of Bakelite or other suitable insulating material having the requisite mechanical strength. Suitable pins 70 and 71 extending through the closure plug 69 provide the conductors leading to the exterior of the cylindrical housing 56, and these pins 70 and 71 are provided with flanges or heads 72 inside the housing 56 so that they cannot be blown out by the high pressure produced therein.

Figure 1:
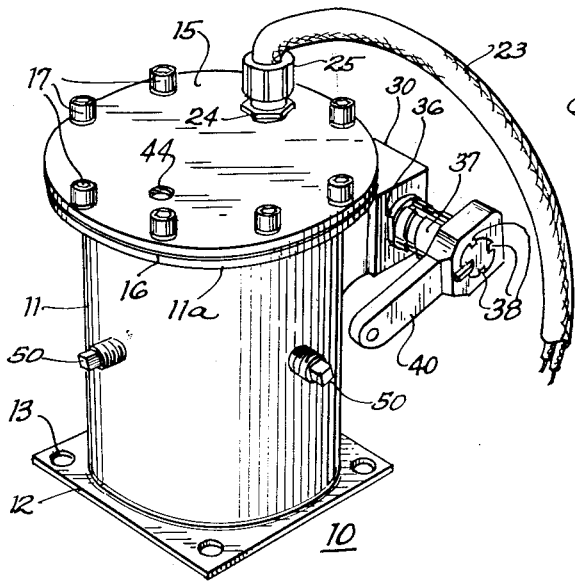
Fig. 1 is a perspective view of one embodiment of an oil immersed solenoid embodying the present invention with the solenoid illustrated as being mounted in a particular position.

In order that the shaft such as 29 may also not be blown out of the housing by the high pressures produced therein, a construction somewhat modified from that shown in Fig. 1 may be employed such as illustrated in Fig. 7. In this construction, the housing portion generally designated at 30 is provided with an enlarged opening 73 at the end opposite the crank arm 40 and the shaft 74 is provided with an enlargement 75 which acts as a head and prevents the shaft from being moved downwardly as viewed in Fig. 7 due to the high pressure within the hermetically sealed container 56. The bushing 36 may be identical with that shown in Fig. 1 of the drawing and the packing gland is generally designated at 76. The connecting rod 28 is connected to the shaft 74 as indicated in the preceding embodiment. In order hermetically to seal the enlarged opening 73, it is preferably closed by a suitable closure plug 78.

The venting arrangement for the explosion-proof construction of Figs. 6 and 7 has not been illustrated, but special vents having somewhat of a pin-hole opening are required which will permit breathing but which will limit the escape of pressure. Such vents are well-known and no discussion thereof is included herewith except to mention that they are employed.

In view of the detailed description included above, the operation of the oil immersed or explosion-proof solenoids of the present invention will readily be understood by those skilled in the art. It will, moreover, be apparent that there has been provided a simple and compact unit which may be mounted in any one of a large number of positions to give the desired operating characteristics. Moreover, with a relatively small housing, the Underwriter's requirements with respect to sealed casings is accomplished and a solenoid which will give long years of satisfactory and fool-proof operation has been provided.

While there have been illustrated and described several embodiments of the present invention, it should be understood that the present invention is not limited to the specific details of construction and arrangement thereof herein illustrated and that changes and modifications will occur to those skilled in the art without departing from the present invention. It is aimed in the appended claims to cover all such changes and modifications as fall within the true spirit and scope of the present invention.

What is claimed as new and desired to be secured by Letters Patent of the United States is:

1. A hermetically sealed solenoid unit comprising a sealed container, a solenoid disposed within said container and including an armature, an insulating liquid in said container, a pivotal shaft journaled in said container and having a portion extending outside said container, means within said container drivingly interconnecting said shaft and the armature of said solenoid, a plurality of openings defined at spaced positions around said casing, closure means for said openings, at least some of said openings being spaced from each other by more than one-eighth of the circumference of the container so that said container may be mounted in a wide variety of positions with at least one of said opening from which said closure means has been removed disposed above the level of the liquid in said container to provide a vent for said sealed container.

2. A hermetically sealed solenoid unit comprising a sealed container, a solenoid disposed within said container and including an armature, an insulating liquid in said container, a pivotal shaft journaled in said container and having a portion extending outside said container, means within said container drivingly interconnecting said shaft and the armature of said solenoid, a plurality of openings defined at spaced positions around said casing, closure means for said openings, said openings being disposed on different sides of the container so that said container may be mounted in a wide variety of positions with at least one of said openings from which said closure means has been removed disposed above the level of the liquid in said container to provide a vent for said sealed container, crank means connected to said shaft outside said casing, and means for connecting said crank means in any one of a plurality of specific positions relative to said shaft.

3. A hermetically sealed solenoid unit comprising a sealed container, a solenoid disposed within said container and including an armature, an insulating liquid in said container, a pivotal shaft journaled in said container and having a portion extending outside said container, a packing gland carried by said container and extending along said shaft, means within said container drivingly interconnecting said shaft and the armature of said solenoid, a plurality of openings defined at spaced positions around said casing, closure means for said openings, said openings being disposed on approximately opposite surfaces of the container so that said container may be mounted in a wide variety of positions with at least one of said openings from which said closure means has been removed disposed above the level of the liquid in said container to provide a vent for said sealed container, electrical connections to said solenoid extending through a wall of said container, and sealing means surrounding said connections and sealing the opening through which said electrical connections pass.

4. A hermetically sealed solenoid unit comprising a sealed cylindrical container, a solenoid disposed within said container and including an armature, an insulating liquid in said container, a pivotal shaft journaled in said casing and having a portion extending outside said container, a packing gland carried by said container and extending along said shaft, means drivingly interconnecting said shaft and the armature of said solenoid, a plurality of openings defined at ninety degree intervals around said cylindrical container, an opening in at least one end of said sealed container, closure means for said openings, said openings permitting said container to be mounted in a wide variety of positions with at least one of said openings from which said closure means has been removed disposed above the level of the liquid in said container to provide a vent for said sealed container.

5. An explosion-proof solenoid unit comprising a cylindrical casing open at one end having a peripheral flange around said open end, a solenoid mounted within said casing and including an armature, a cover for said open end including a sealing portion for engagement with said flange, means for increasing the width of said sealing surface without widening said flange comprising an annular sealing surface defined on the inside wall of said casing immediately adjacent said flange, a depending cooperating annular surface on said cover thereby providing a linear width of sealing surface comprising the width of said flange plus the width of said depending annular surface, a pivotal shaft journaled in said casing and having a portion extending outside said casing, means within said casing interconnecting said solenoid and said shaft whereby operation of said solenoid causes pivotal movement of said shaft, a packing gland received within the wall of the casing and extending along said shaft, and means carried by said shaft and engaging said casing for preventing high pressures generated in said casing for moving said shaft in an axial direction.

6. An explosion-proof solenoid unit comprising a cylindrical casing open at one end having a peripheral flange around said open end, a solenoid mounted within said casing, a cover for said open end including a sealing portion for engagement with said flange, said cover and said casing defining a housing, means for increasing the width of said sealing surface without widening said flange comprising an annular sealing surface defined on the inside wall of said casing immediately adjacent said flange and a depending cooperating annular surface on said cover thereby providing a linear width of sealing surface comprising the width of said flange plus the width of said depending annular surface, said depending annular surface having a width of the order of the width of said peripheral flange, said annular surface on said inside wall and said depending cooperating annular surface providing a seal, means defining a conical opening in said housing and having its longer diameter at the inner wall thereof, an insulating plug in said opening disposed so that high pressures in said casing cause said plug to be more firmly retained in said opening, electrical conductors extending through said plug, and flanges on said conductors adjacent the surface of said plug within said casing thereby preventing high pressures within said casing from forcing said conductors out of said plug.

7. A hermetically sealed explosion-proof solenoid unit comprising a cylindrical casing open at one end, a solenoid disposed within said casing and including an armature, an insulating medium in said casing, a pivotal shaft journaled in said casing and having a portion extending outside said casing, a packing gland received within the wall of the casing and extending along said shaft, means drivingly interconnecting said shaft and the armature of said solenoid, a peripheral flange around the open end of said casing, a cover for said open end including a sealing portion for engagement with said flange, means for increasing the width of said sealing surface without widening said flange comprising an annular sealing surface defined on the inside wall of said casing immediately adjacent said flange and a depending cooperating annular surface on said cover thereby providing a linear width of sealing surface comprising the width of said flange plus the width of said depending annular surface, and pressure withstanding means for electrical conductors extending through the cover of said casing.

References Cited in the file of this patent

UNITED STATES PATENTS

| Number | Name | Date |
|---|---|---|
| 252,391 | Maxim | Jan. 17, 1882 |
| 1,031,624 | Dahlquist et al. | July 2, 1912 |
| 1,220,603 | Cartwright | Mar. 27, 1917 |
| 1,270,236 | Eckfeldt | June 18, 1918 |
| 1,292,650 | Rippl | Jan. 28, 1919 |
| 1,568,210 | Colstad | Jan. 5, 1926 |
| 1,620,411 | Temple | Mar. 8, 1927 |
| 1,680,412 | Eaton | Aug. 14, 1928 |
| 1,884,071 | Menzel | Oct. 25, 1932 |
| 1,885,433 | Hall | Nov. 1, 1932 |
| 2,133,174 | Minich | Oct. 11, 1938 |
| 2,411,800 | Nardone | Nov. 26, 1946 |
| 2,449,901 | Kaiser | Sept. 21, 1948 |
| 2,452,742 | Franzene | Nov. 2, 1948 |